US 9,883,413 B2

(12) United States Patent
Cama et al.

(10) Patent No.: US 9,883,413 B2
(45) Date of Patent: Jan. 30, 2018

(54) MANAGEMENT OF GROUP MOBILE DEVICE NETWORK TRAFFIC USAGE

(71) Applicant: AT&T Intellectual Property I, L.P., Atlanta, GA (US)

(72) Inventors: Cynthia Cama, Belmar, NJ (US); Jeffrey Erman, Morristown, NJ (US); Wen-Ling Hsu, Bridgewater, NJ (US); Yu Jin, Madison, NJ (US); Ann E. Skudlark, Westfield, NJ (US); Lien K. Tran, Chatham, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 276 days.

(21) Appl. No.: 13/918,085

(22) Filed: Jun. 14, 2013

(65) Prior Publication Data
US 2014/0370843 A1   Dec. 18, 2014

(51) Int. Cl.
*H04W 4/24* (2009.01)
*H04W 24/08* (2009.01)
*H04W 24/04* (2009.01)

(52) U.S. Cl.
CPC .......... *H04W 24/08* (2013.01); *H04W 24/04* (2013.01)

(58) Field of Classification Search
CPC .................................. H04W 4/24; H04W 4/26
See application file for complete search history.

(56) References Cited

U.S. PATENT DOCUMENTS

| 2005/0048987 | A1* | 3/2005 | Glass | H04M 1/72544 |
| | | | | 455/456.1 |
| 2005/0282559 | A1* | 12/2005 | Erskine | H04M 3/38 |
| | | | | 455/456.4 |
| 2006/0031368 | A1* | 2/2006 | Decone | G06F 9/546 |
| | | | | 709/207 |
| 2009/0203352 | A1* | 8/2009 | Fordon | H04M 15/00 |
| | | | | 455/406 |
| 2010/0130170 | A1* | 5/2010 | Liu | H04W 36/0022 |
| | | | | 455/411 |
| 2012/0072583 | A1 | 3/2012 | Kupferman et al. | |
| 2013/0023230 | A9 | 1/2013 | Momtahan et al. | |
| 2013/0130652 | A1 | 5/2013 | Deasy et al. | |
| 2014/0066008 | A1* | 3/2014 | Ingino | H04M 15/43 |
| | | | | 455/408 |
| 2014/0066117 | A1* | 3/2014 | Egner | H04W 4/003 |
| | | | | 455/513 |
| 2014/0087688 | A1* | 3/2014 | Chiu | H04M 15/43 |
| | | | | 455/406 |

* cited by examiner

*Primary Examiner* — Daniel Lai
*Assistant Examiner* — Frank Donado
(74) *Attorney, Agent, or Firm* — Amin, Turocy & Watson, LLP

(57) ABSTRACT

Network traffic usage information for a set of registered devices is monitored, analyzed, and reported within a cellular service provider portion of a communications network. The network traffic usage information can relate to data traffic, voice traffic, and/or short message service traffic. Reporting the network traffic usage information is customizable such that parameters associated with the network traffic usage can be changed, depending on the parameters that are of current interest to an organization affiliated with the set of registered devices.

20 Claims, 10 Drawing Sheets

MANAGEMENT OF GROUP MOBILE DEVICE NETWORK TRAFFIC USAGE

TECHNICAL FIELD

The subject disclosure relates to wireless communications and, also generally, to management of group mobile device network traffic usage.

BACKGROUND

Various organizations provide their constituents with mobile devices, such as cell phones and tablets, for example. Since the mobile devices belong to the organization, usage of the mobile devices must comply with organizational policies. Further, some constituents might use their own device and toggle between personal use and access to organizational resources, such as email and Intranet sites. Access to the organizational resources must also comply with the organizational policies. Some methods for monitoring data and voice usage of the mobile devices requires installation of activity monitoring software, which has a high cost associated with deployment and management. Another method relates to routing all traffic of the mobile devices to a collection point for analysis. However, the cost for deployment of a collection point is high and each device must be reconfigured to accommodate the routing path, which can increase a latency of the link and negatively impact the user experience.

BRIEF DESCRIPTION OF THE DRAWINGS

Various non-limiting embodiments are further described with reference to the accompanying drawings in which.

DETAILED DESCRIPTION

Figure 1:
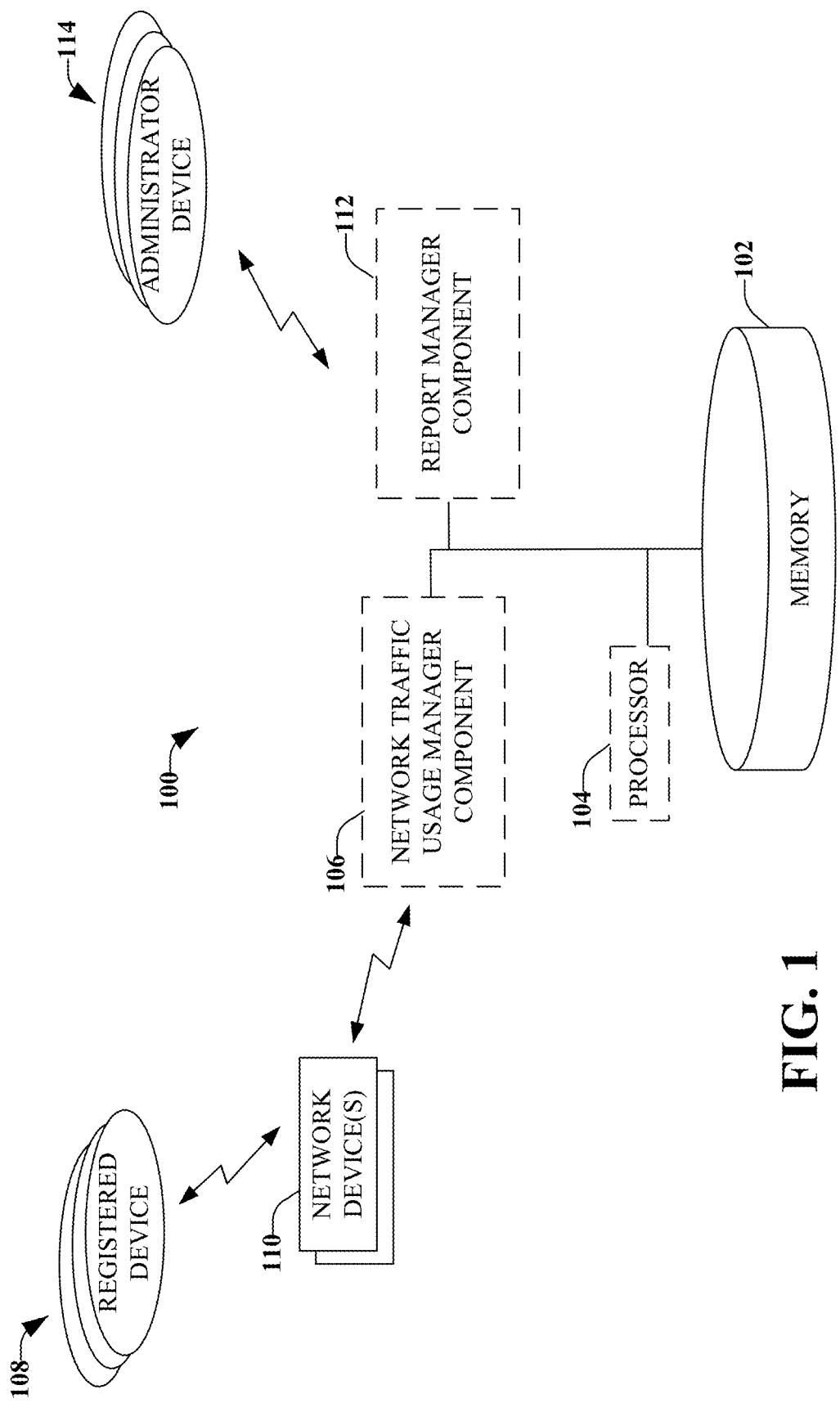
FIG. 1 illustrates an example, non-limiting system configured to facilitate management of group mobile device network traffic usage, according to an aspect.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The disclosed aspects provide a comprehensive approach for management of group mobile device network traffic usage. The management includes monitoring, analyzing, and reporting network traffic usage of each mobile device included in a registered group of mobile devices and/or for an aggregation of network traffic usage for two or more of the mobile devices. Further, the disclosed aspects provide the management of mobile device network traffic usage autonomously, without an application needing to be executed on each mobile device, which reduces overhead and provides implementation efficiencies. For example, the disclosed aspects can be configured to operate within a communications network (e.g., a cellular network) and can perform real-time data collection. Further, the disclosed aspects can provide organizations with comprehensive and fully customized usage reports for data traffic usage, voice traffic usage, short message service (SMS) traffic usage, and so forth.

There has been a significant increase in the usage of mobile devices. It has been estimated that there is almost a one hundred percent penetration of mobile device usage in the United States, with approximately half of the mobile devices in use being smart phones. Globally there are close to two billion mobile phones and almost seventy million tablets in use. Mobile devices have extended their use beyond voice calling and simple email applications. In recent years, mobile data traffic has increased around two hundred and thirty percent, with more than half of the traffic coming from video. Furthermore, along with the rapid growth and evolution of mobile devices, many mobile applications have been developed and have become popular among mobile users. It has been reported that more than one third of subscribers in the United States actively use at least one mobile application daily. Mobile applications greatly impact daily life by enabling users to more easily access the Internet, access emails, work efficiently through mobile devices as well as watch videos and play games. Due to the ubiquity of mobile devices, many organizations have provided their constituents (e.g., employees, staff, associates, partners, contractors, sub-contractors, and so on) with centrally owned mobile units. While the centrally owned mobile units help improve productivity and provide work life flexibility, such units are posing a challenging task to organizations to manage and audit the device usage, especially when facing expanded mobile functionality and high data usage.

Some solutions for managing and auditing device usage require installation of activity monitoring software on each device. This software tracks the data and voice usage on the devices and delivers the information to a remote server. However, the huge cost of deploying and managing such activity monitoring software hinders the adoption of this solution. Further, implementation of the software on the device and/or removal of the software from the device present challenges related to timeliness as well as other concerns, including deployment issues.

Other solutions for managing and auditing device usage requires routing all the data traffic of the device to a collection point (e.g., a proxy server or a virtual private network (VPN) server), where such traffic is collected and analyzed. However, the cost for deploying this solution is high and deployment is complex since each device needs to be reconfigured to set up the routing path. Further, having all the data go through the collection point can significantly increase the latency of the line and, therefore, can negatively impact the user experience. Moreover, only data traffic can be captured at the collection point, which is not applicable to voice traffic and/or SMS traffic.

The disclosed aspects address the above noted issues by collecting traffic directly inside the cellular network without the need to modify each device, execute software on each device, and/or change a routing protocol on each device. The disclosed aspects can also manage more than one type of network traffic usage information, including, voice traffic, data traffic, and short message service traffic. Further, the disclosed aspects provide comprehensive and fully customized usage reports for the organizations to manage the group mobile devices network traffic usage. In the mobile application market, there is currently no offering of such services.

Further, one or more of the disclosed aspects relate to gathering information, including network traffic usage information, from a group of devices. The gathered information can be aggregated and one or more authorized persons can observe the aggregated data in the form of reports, for example.

Referring initially to FIG. 1, illustrated is an example, non-limiting system 100 configured to facilitate management of group mobile device network traffic usage, according to an aspect. System 100 comprises at least one memory 102 that can store computer executable components and instructions. System 100 can also include at least one processor 104, communicatively coupled to the at least one memory 102. Coupling can include various communications including, but not limited to, direct communications, indirect communications, wired communications, and/or wireless communications. The at least one processor 104 can facilitate execution of the computer executable components stored in the at least one memory 102. The at least one processor 104 can be directly involved in the execution of the computer executable component(s), according to an aspect. Additionally or alternatively, the at least one processor 104 can be indirectly involved in the execution of the computer executable component(s). For example, the at least one processor 104 can direct one or more components to perform the operations.

It is noted that although one or more computer executable components may be described herein and illustrated as components separate from the at least one memory 102 (e.g., operatively connected to memory), in accordance with various embodiments, the one or more computer executable components could be stored in the at least one memory 102. Further, while various components have been illustrated as separate components, it will be appreciated that multiple components can be implemented as a single component, or a single component can be implemented as multiple components, without departing from example embodiments.

System 100 also includes a network traffic usage manager component 106 that can be configured to receive, either directly or indirectly (e.g., through another component) data associated with one or more registered devices 108. The received data can include, but might not be limited to, data traffic (including mobile data traffic). For example, data traffic information can include a number of uploading bytes, a number of downloading bytes, applications and content providers, and so forth. Other examples of received data can include, but might not be limited to, voice traffic (e.g., voice call traffic) and SMS traffic. For example, SMS traffic information can include the number of SMS messages sent and/or the number of SMS message received. The voice traffic information can include, for example, the number of voice calls sent, the number of voice calls received, a voice call duration, a cumulative voice call duration, and so on.

The network traffic usage information can be collected by one or more network devices 110 that can receive communications from (and can transmit communications to) the one or more registered devices 108. Further, the one or more network devices 110 can send the collected network traffic usage information to the network traffic usage manager component 106 for further processing. In an example, the network devices 110 can be gateway GPRS (general packet radio service) support nodes (GGNS). In another example, the network devices 110 can be mobile switching center (MSCs) devices. According to some implementations, the network devices 110 can comprise both gateway GPRS support nodes and mobile switching center devices.

Each device of the one or more registered devices 108 can be one of several different types of mobile devices and/or wired devices. For example, such devices can be digital mobile radio units, cellular phones, personal digital assistants (PDAs), computers, and so forth. Further, the one or more registered devices 108 can be devices supplied by an organization and/or devices authorized by the organization to be used with organizational resources. As utilized herein, an organization can be any type of entity such as businesses, universities, governments, small business owners, and so on. Organizations increasingly provide their constituents (e.g., employees, students, and so on) mobile devices, referred to as centrally owned mobile units, (e.g., mobile devices) which can include cell phones and tablets (e.g., registered devices). Because these centrally owned mobile units belong to the organization, the usage of the units should comply with organizational policies. As a result, there is a demand for an effective way to manage and audit these centrally owned mobile units to ensure compliance. As used herein, centrally owned mobile units (or registered devices) can also include a category of devices that are owned by the constituents (e.g., employee, student), wherein the constituents bring their own device, but take advantage of software that allows the end user (constituent) to switch between personal use and access to organizational resources such as email and Intranet sites.

The network traffic usage manager component 106 can be configured to operate, at least in part, as a data store and retain the network traffic usage information. For example, the network traffic usage information for each device can be identified and stored in a database or in a data store for further processing, analysis, and reporting purposes as discussed herein. Retrieval of the network traffic usage information for each device, a subset of two or more devices of the multitude of registered devices, or all the devices of the multitude of registered devices, can be facilitated by accessing the database in order to respond to a data request (e.g., by the organization). According to another implementation, network traffic usage manager component 106 can be configured to access a data store that is external to network traffic usage manager component 106 but located internal to system 100. In another implementation, the data store can be external to system 100.

Further, the network traffic usage manager component 106 can be configured to provide information that can be used to generate usage reports based upon the requests of the organization with which the one or more registered devices 108 are associated. For example, the organization (e.g., an individual authorized to act on behalf of the organization)

can request customized reports that provide information as to the traffic usage of the one or more registered devices 108 and which information is beneficial to the organization.

In order to request and receive the customized reports, the authorized individual can submit a request to a report manager component 112 through one or more administrator devices 114. According to an implementation, at least a portion of the report manager component 112 is integrated with the one or more administrator devices 114. In another implementation, at least a portion of the system 100 is integrated with the one or more administrator devices 114.

In an implementation, the report can be sent to a device associated with a subscribing organization, wherein the system is included in network devices of a communications network that are associated with a cellular service provider identity. According to some implementations, report manager component 112 can be integrated with the one or more administrator devices 114 as one or more mobile applications, one or more report websites, and/or through other manners of interaction. In such a manner, the authorized individual can specify a report that is customized. For example, the organization can specify what types of information should be included in the report. In another example, the organization can define thresholds on specific network traffic statistics.

As discussed, system 100 can be configured for real-time data collection and usage reporting. For example, a data collection engine (e.g., one or more network devices 110) can execute (or operate) inside the cellular network. This can help ensure the timeliness of the report and full coverage of network traffic activities of the registered devices, including voice traffic usage, data traffic usage, and/or SMS traffic usage.

Further, the collection of network traffic usage can be conducted at the cellular service provider side. Therefore, no software installation or reconfiguration is required on the registered device side. Additionally, the disclosed aspects can provide for ease of management and deployment. Organizations can easily add devices that are to be monitored and/or remove devices that no longer should be monitored without affecting existing devices that are included in a group or set of registered devices. Thus, system 100 can be scalable and the amount of devices monitored can be increased and/or decreased as a function of changes implemented by the organization.

For example, when a particular device is registered by the organization (e.g., through one or more administrator devices 114), monitoring of the network traffic usage activity for that particular device can begin almost immediately. For example, a data structure can be retained (in the one or more memory 102 or a different data store) that includes a listing of all devices contained within a group of registered devices. The data structure can be maintained in various types of formats, such as a mapping between the device and its associated traffic data usage. Therefore, there is minimal computational processing costs and battery/memory requirement imposed at the end user devices, since no software has to be installed on the user devices, which can potentially impact productivity. Further, when a device is to be removed from the group of registered devices, such as when an employee has brought their own device and employment with the organization has been terminated, monitoring of the device can stop at substantially the same time as the device is removed from the list of registered devices. The devices can be added and/or removed from the listing based on instructions received from the one or more administrator devices 114.

Further, since all detections (e.g., network traffic usage monitoring) are conducted inside the cellular network, there is no specific requirement, such as computation power and operating system, on the user devices (e.g., registered devices). Therefore, the disclosed aspects are able to monitor mobile devices, including smartphones (of any mobile operation systems), feature phones, data cards, PDAs, netbooks, tablets, and so on. In addition, the disclosed aspects adopt a variety of ways to ensure that organizations can retrieve usage reports and can be alerted of emerging events, no matter where the person requesting the report is located and no matter what type of device (e.g., administrator device 114) the person is using to access the information. For example, usage reports can be retrieved using a mobile application and/or by accessing a report website. The usage alerts can also reach the organization through push notification, SMS messages, emails, and so on.

Figure 2:
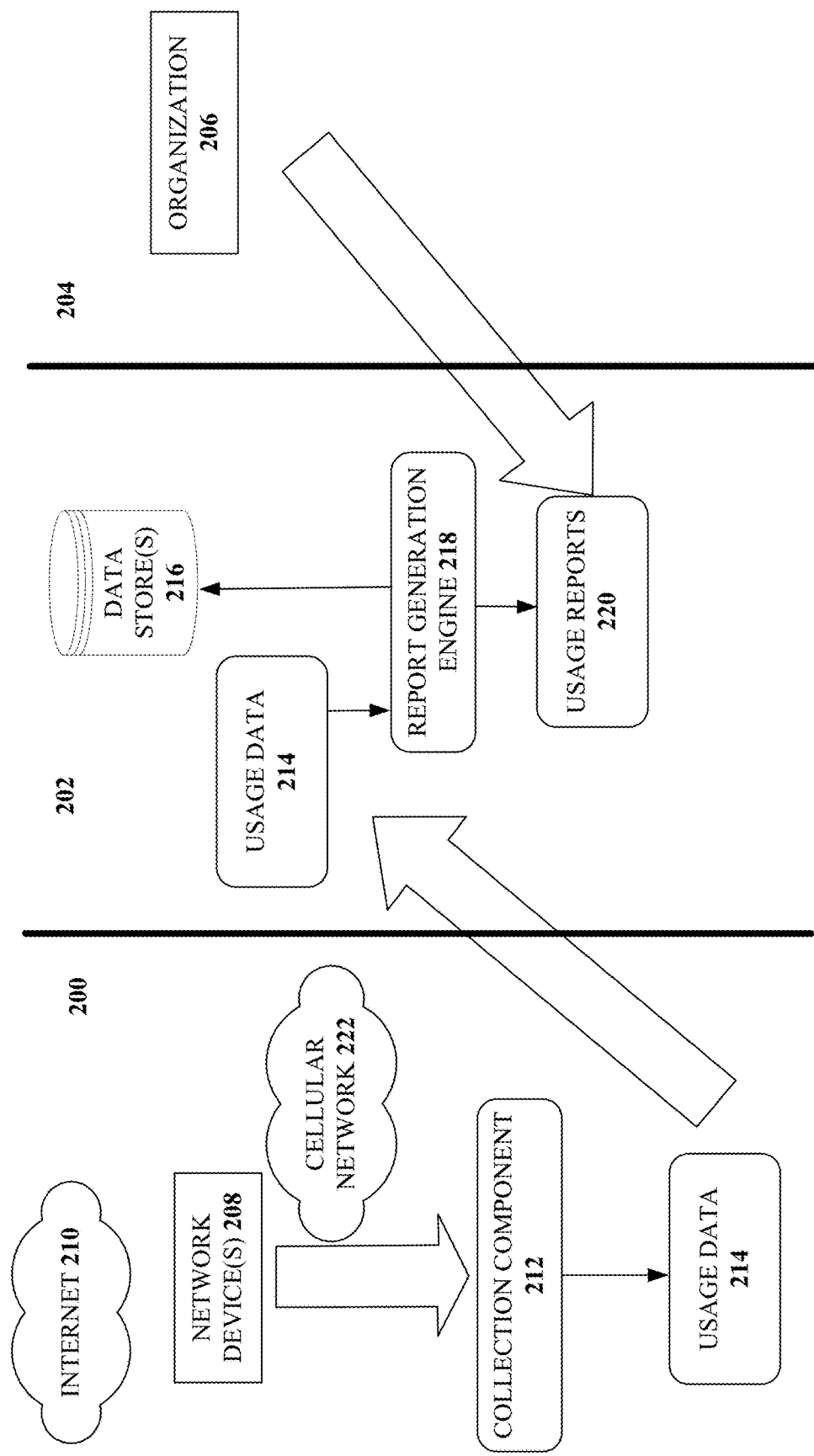
FIG. 2 illustrates an example, non-limiting implementation of network traffic data collection, analysis, and reporting, according to an aspect.

FIG. 2 illustrates an example, non-limiting implementation of network traffic data collection, analysis, and reporting, according to an aspect. It is noted that the illustrated implementation is one example for data collection and analysis and the disclosed aspects are not limited to this example. Instead, other network traffic usage collection systems are contemplated and can be utilized with the various aspects discussed herein.

The example implementation is divided into different portions, namely, a collection portion 200, an analysis and report generation portion 202, and a report request and retrieval portion 204. An organization 206 registers with a network provider (or a third party service provider) in order to monitor a group of devices. Each device of the group of devices is registered by the organization 206 (e.g., a user acting on behalf of the organization). For example, identifying information of each device to be registered can be provided to the network provider (or third party service provider).

At least one network device 208 (e.g., the one or more network devices 110 of FIG. 1), processes network traffic for a list of registered centrally owned mobile units (e.g., through the Internet 210), as well as processing network traffic for non-registered devices. For example, gateway GPRS support nodes and/or a mobile switching center can process network data traffic for the mobile units. The network traffic information is received by a collection component 212 that can compile the network traffic information as usage data 214 and send the usage data to the report generation portion 202. In an implementation, the usage data includes call data records (CDRs). In an example, the usage data can be retained in a storage device 216 that stores the network traffic information in a database(s) or data store(s), for example.

The network traffic usage information collected and retained in the storage device 216 can include the number of uploading/downloading bytes, applications and content providers, and so forth. In another example, the network traffic usage information collected can include voice call traffic and SMS traffic information. The voice call traffic information can include the number of voice calls sent, the number of voice calls received, the voice call duration of the individual mobile unit, and so on. The SMS traffic information can include the number of SMS messages sent, the number of SMS messages received, and so on.

Based on one or more requests from the organization 206, a report generation engine 218 can create one or more usage reports 220 from the usage data 214. In an example, the one or more usage reports 220 can be bandwidth usage reports. Further, the one or more usage reports 220 can be continuously updated (or updated according to another parameter, such as periodically, based on a request for a report, and so on) such that upon a request from the organization 206 to retrieve a usage report, the report is available (e.g., on demand).

The usage reports can be accessible from a variety of means. For example, the usage reports are accessible from mobile applications or through report websites. Further, the usage report can be customized, as requested. For example, the organization can specify what types of information should be included in the report. Additionally, two or more reports that detail different types of information can be accessed by the organization and/or by different individuals within the organization.

Full customization of the report(s) allows the organization the ability to define what traffic statistics should be included in the report, the frequency of the report, and the granularity of the report. The frequency of the report can represent a frequency for how often the reports should be sent. The granularity of the report can represent a defined level of detail for the reports. For example, the report can include the top content providers and top services (e.g., web browsing, video streaming, email services, and so on) among all the registered devices. The organization can also request customization of the report to identify the top users (e.g., user device) that accesses these content providers and services. Additionally or alternatively, for each registered device, a drill-down report is available. The drill-down report can cover, for example, the top applications, content providers, and top services accessed by each respective registered device.

Further, in addition to the reports and/or alternatively to the report, the organization can define thresholds on specific (and different) traffic statistics. For example, the thresholds can include a usage cap of each device, certain websites banned by the organization, and so on. Once reaching thresholds, an alert can be triggered automatically to inform the organization (and/or the device user) of an occurrence of interested events or interesting activities. Such interested events can include, but are not limited to, a breach of security and access policies, an unusual increase of data/voice usage, which may signal certain emerging attacks, and so on. The interesting activities can also include an end user using more usage than permitted and/or accessing (or attempting to access) restricted websites. The alerts can reach the organization in a variety of ways, such as emails, mobile applications, SMS messages, and so on. Also, as indicated, a user of the device can also receive a notice of the interested event and/or interesting activity. In such a manner, network traffic usage can be controlled in a real-time manner, without the need to wait until a report is requested.

Figure 3:
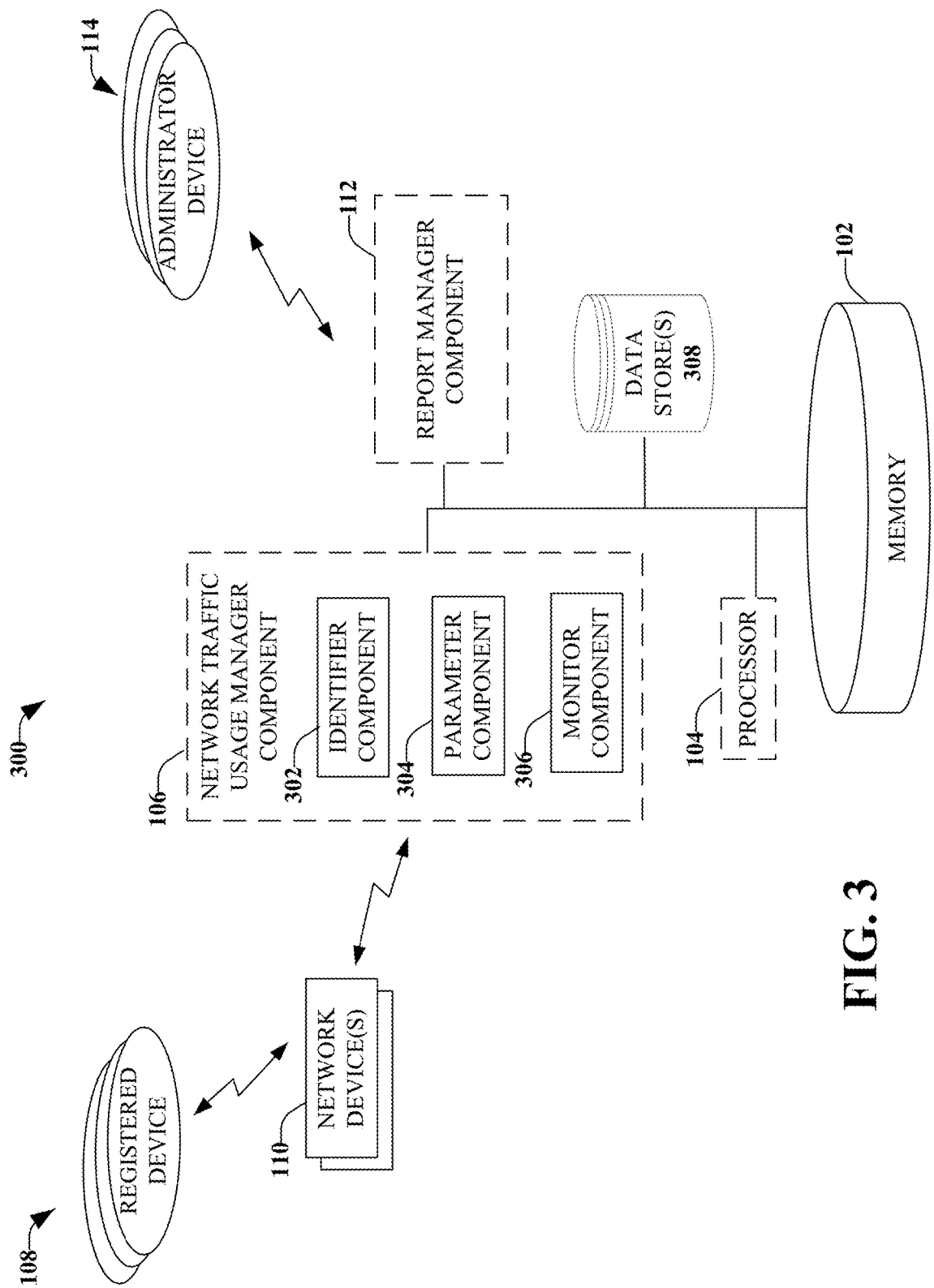
FIG. 3 illustrates another example, non-limiting system for monitoring, analyzing, and reporting group mobile device network traffic usage, according to an aspect.

FIG. 3 illustrates another example, non-limiting system 300 for monitoring, analyzing, and reporting group mobile device network traffic usage, according to an aspect. The aspects provided herein allow for organizations, as well as other entities, to monitor the network traffic usage of centrally owned mobile units in near real-time. The disclosed aspects provide continuous traffic statistics collection in both the voice channels and the data channels of a registered mobile device. The disclosed aspects also provide low-cost deployment and management of different types of centrally owned mobile units (e.g., more than one type of mobile unit can be monitored). Further, the disclosed aspects can be implemented with minimal processing requirements from the end-user device (e.g., applications do not need to be downloaded on the device, modifications do not need to be made to the device, and so forth). Another advantage of the disclosed aspects is that the customization of reports can assist with enforcement of access policies of both the cellular service providers and the organizations. Another advantage is the accessibility of centrally owned mobile unit network traffic usage reports through a variety of interfaces (e.g., mobile applications, websites, voice reports, data reports, SMS, and so on). Further, the disclosed aspects provide for full customization of statistics included in the network traffic usage reports. Another advantage provided herein is that thresholds can be established to alert the organization of interesting events.

System 300 includes an identifier component 302 that can be configured to receive data representative of one or more devices to include in a set of registered devices (e.g., the one or more registered devices 108). The data representative of the devices can include an international mobile subscriber identity (IMSI) of the device, a phone number of the device, and/or other identifying information. The data representative of the devices can be received from one or more administrator devices 114.

Also included in system 300 is a parameter component 304 that can be configured to receive one or more criteria that are of interest to the organization. For example, an organization might be interested in minimizing the amount of voice calls and/or the duration of voice calls. Therefore, a criteria can relate to the number of sent and/or received voice calls. In another example, the criteria can relate to a duration of voice calls. In a further example, the organization might be interested in limiting the amount of time spent browsing the internet and, thus, the criteria can relate to the amount of time spent accessing the internet.

A monitor component 306 is configured to monitor the network traffic usage of each device. The monitor component 306 can monitor the one or more criteria specified by the organization, as well as other forms of network traffic usage. By monitoring all (or substantially all) network traffic usage events, as needs of the organization change and/or if something develops and different and/or expanded network traffic usage information is needed, that information is available at substantially the same time as a request for the information is received (e.g., through report manager component 112).

According to an implementation, one or more data stores 308 can be integrated with the network traffic usage manager component 106. In another implementation, one or more data stores 308 can be located external to, but accessible by, the network traffic usage manager component 106. It is noted that a data store can include volatile memory or nonvolatile memory, or can include both volatile memory and nonvolatile memory. By way of illustration, and not limitation, nonvolatile memory can include read only memory, programmable read only memory, electrically programmable read only memory, electrically erasable programmable read only memory, or flash memory. Volatile memory can include random access memory, which can operate as external cache memory. By way of illustration and not limitation, random access memory is available in many forms such as static random access memory, dynamic random access memory, synchronous dynamic random access memory, double data rate synchronous dynamic random access memory, enhanced synchronous dynamic random access memory, Synchlink dynamic random access memory, and direct Rambus random access memory. The memory (e.g., data stores, databases, and so on) of the various disclosed aspects is intended to comprise, without being limited to, these and any other suitable types of memory.

Figure 4:
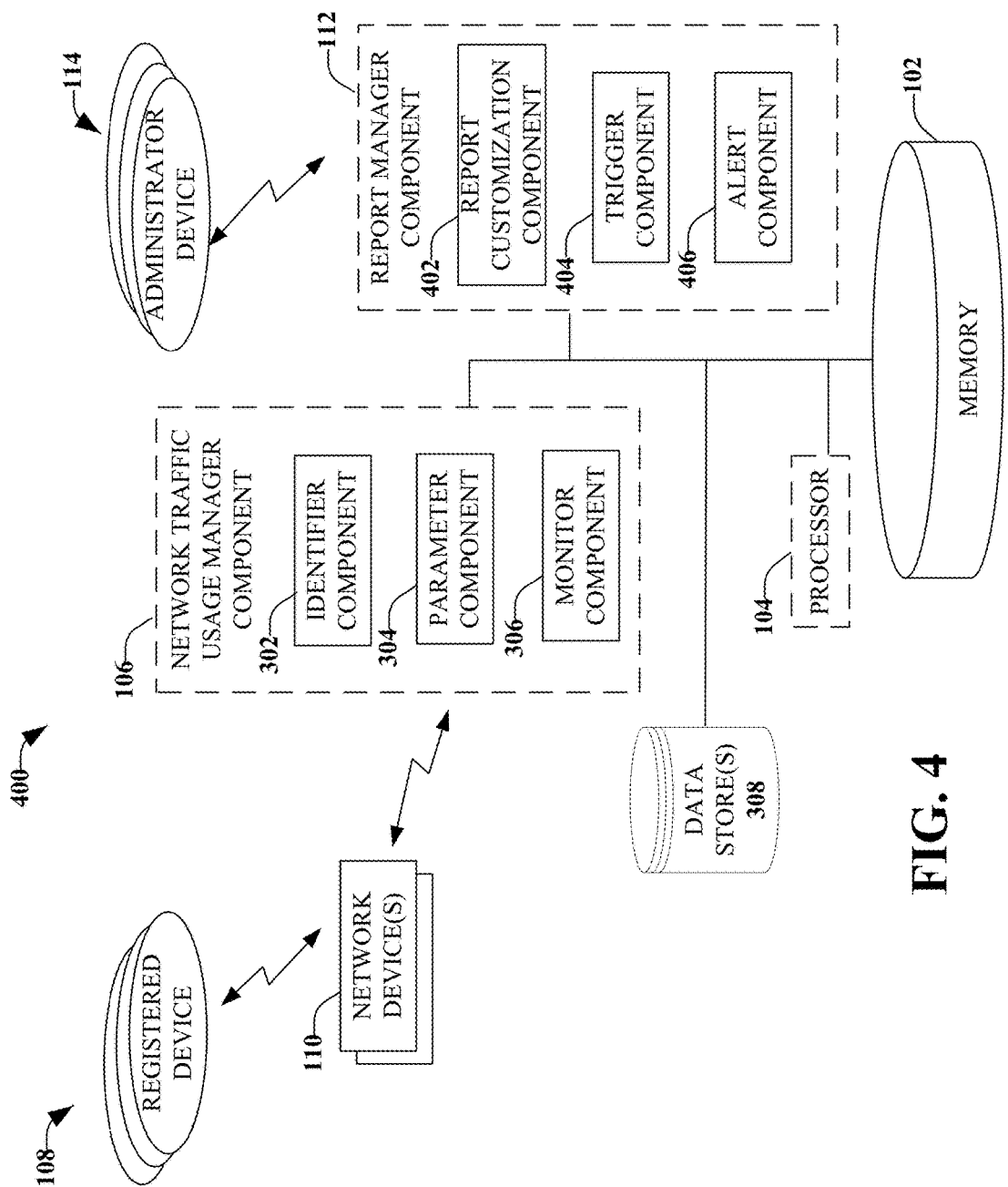
FIG. 4 illustrates an example, non-limiting system for managing network traffic usage reports and establishing thresholds, according to an aspect.

FIG. 4 illustrates an example, non-limiting system 400 for managing network traffic usage reports and establishing thresholds, according to an aspect. A report customization component 402 can be configured to receive various instructions from the one or more administrator devices 114 to provide information related to the network traffic usage of at least one of the one or more registered devices 108.

For example, the one or more network devices 110 can be utilized as a web-based and/or application-based mobile network traffic usage manager for a registered group of individual devices (e.g., the one or more registered devices 108). The one or more network devices 110 can collect and send network traffic usage information to the network traffic usage manager component 106, which can analyze and report on bandwidth usage, data usage, voice usage, SMS usage, and so forth, on the one or more registered devices 108 affiliated with an organization.

Daily, or at other intervals, the report manager component 112 can tabulate, analyze, and create reports on the usage data, which includes the data, voice, and/or SMS usage data. Organizations and end users may retrieve the reports on demand, at regular intervals, at periodic intervals and/or at other intervals. Further, the reports can include information related to suspicious activities (e.g., heavy data usage, usage that is not considered normal usage for a particular device, and so on).

The report customization component 402 can perform fast report retrieval. The reports can be generated at a server at about the same time as new bandwidth data are collected (e.g., by the one or more network devices 110) and analyzed (e.g., by the network traffic usage manager component 106). Organizations and end users may retrieve reports in an "on-demand" manner through a web-based tool, through their mobile devices, or through other interfaces.

The data source for the system 400 is the cellular network data (e.g., through the network devices 110). Thus, the accuracy of the reports is ensured. Further, since the report generation engine (e.g., report manager component 112) runs at the service provider network (e.g., in the cellular network), there is little (if any) computation cost at the end user devices (e.g., the one or more registered devices 108). Further, the report manager component 112 can provide bandwidth usage reports that comprise top categories summary and/or drilled down detailed reports. Users (e.g., organizations) can control the level of bandwidth usage details that are desired.

According to an implementation, the bandwidth usage reports can include various types of reports. It is noted that although various example reports will now be described, the disclosed aspects are not limited to these example reports and other types of reports can be provided. An example report can include the total of data usage, the total of voice usage, the total of SMS usage, or combinations thereof, that the enterprise (e.g., organization) has consumed for a billing cycle.

Another example report can include the top data users (e.g., the top twenty-five data users). This report can list the top (e.g., the top twenty-five data users) mobile devices that have used the most bandwidth, including the amount of data used. For each top user, drilled-down reports can be available for the top applications, the top content providers, and/or the top services.

A further example report can include the top content provides that have provided the most data volume. For each top content provider, a detailed report of the top users and the bandwidth data usage provided by this content provider can be included in the report.

Yet another example report can include the top services that used the most bandwidth. For each top service, a detailed report of the top users and their bandwidth data usage provided by this service can be included in the report.

In an additional or alternative implementation, thresholds can be utilized in order to trigger alerts and/or restrict usage in certain circumstances. A trigger component 404 can be configured to receive one or more parameters associated with various network traffic usage information. The parameters can be received from the organization through the one or more administrator devices 114. For example, a parameter can relate to a maximum number of outgoing voice calls. In another example, a parameter can relate to a maximum number of incoming text messages. In yet another example, a parameter can relate to a category of websites, wherein the category defines restricted websites that should not be accessed by a user of the mobile device.

As network traffic usage manager component 106 receives the network traffic usage information from one or more network devices 110, the trigger component 404 (or another component) can analyze the information. For example, the trigger component 404 (or another component) can determine whether the network traffic usage information satisfies a condition related to the parameter (e.g., is an unauthorized website attempting to be accessed, is a duration of a voice call at (or exceeding) a specified maximum time duration, and so on). If the condition (or parameter) is satisfied, an alert component 406 sends a notice to the one or more administrator devices 114 and/or to the registered device whose network traffic usage has satisfied the condition.

The alert component 406 can send the notice to the organization and/or end user through a variety of manners. For example, the notice can be sent through a push notification to the organization (e.g., through the one or more administrator devices 114) and/or end user (e.g., through the respective registered device). In another example, the notice can be sent as a SMS message. In yet another example, the notice can be sent as an email notification. In another example, the notification can be sent as a voice call (e.g., recording or live message) to the organization and/or end user. Providing the notice to the organization can make the organization aware of the potential breach and/or potential security issue. Providing the notice to the end user can allow the end user to modify the device usage and comply with organization policies, as needed.

Figure 5:
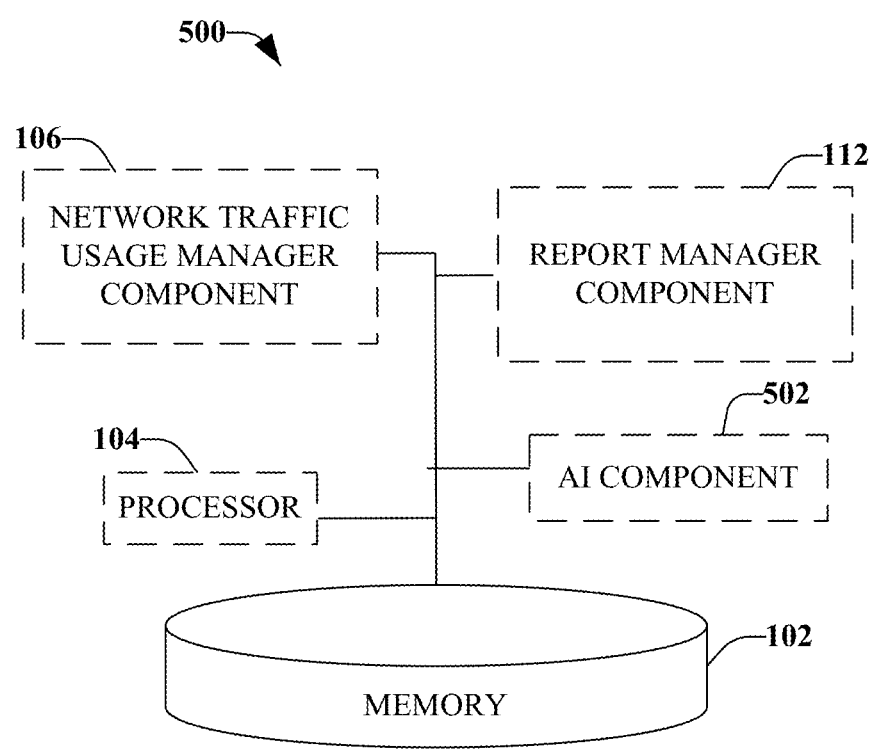
FIG. 5 illustrates an example, non-limiting system that employs an artificial intelligence component, which can facilitate automating one or more features in accordance with the disclosed aspects.

FIG. 5 illustrates an example, non-limiting system 500 that employs an artificial intelligence component 502, which can facilitate automating one or more features in accordance with the disclosed aspects. As discussed herein, the disclosed aspects have a wide application across the field of network traffic usage. The usage reports allow organizations to take control of the registered devices to avoid unnecessary unproductive network traffic usage and/or to identify activities violating network security policies. The reports can also be used for resource management and optimization. For example, the reports can be used to identify high usage users or data activities that could potentially cause service degradation for business applications (including critical business applications). Meanwhile, such reports can serve as feedback for organizational network regulations and policies improvement as well as enforcement methods and procedures.

As illustrated in FIG. 5, at least one memory 102, at least one processor 104, a network traffic usage manager component 106, a report manager component 112, as well as other components (not illustrated) can include functionality, as more fully described herein, for example, with regard to the previous figures. The disclosed aspects in connection with monitoring, analyzing, and reporting device network traffic usage can employ various artificial intelligence-based schemes for carrying out various aspects thereof. For example, a process for receiving a device identity, associating the device identity with network traffic usage information, storing the network traffic usage information, and/or compiling the network traffic usage information can be facilitated with an example automatic classifier system and process. In another example, a process for creating reports from the network traffic usage information and providing the reports upon request and/or based on one or more triggering events can be facilitated with the example automatic classifier system and process.

An example classifier can be a function that maps an input attribute vector, $x=(x1, x2, x3, x4, xn)$, to a confidence that the input belongs to a class, that is, $f(x)=$confidence(class). Such classification can employ a probabilistic and/or statistical-based analysis (e.g., factoring into the analysis utilities and costs) to prognose or infer an action that can be automatically performed. In the case of communication systems, for example, attributes can be types of network traffic usage (e.g., voice traffic, data traffic, short message service traffic, and so on) and the classes can be the amount of network traffic usage, the type of network traffic usage, the duration of each type of network traffic usage, and so on.

A support vector machine is an example of a classifier that can be employed. The support vector machine can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing network traffic usage, observing data associated with customized reports, and so on). For example, support vector machines can be configured via a learning or training phase within a classifier constructor and feature selection module. Thus, the classifier (s) can be used to automatically learn and perform a number of functions, including but not limited to determining a network traffic usage condition would be interesting to an organization, determining a particular device has abnormal network traffic usage behavior, anticipating the data that should be included in a particular report based on historical requests for a set of reports, and so forth. Further functions can include, but are not limited to, gathering information (e.g., network traffic usage information) from a group of devices, aggregating the data gathered from the group of device, allowing one or more persons of authority and responsibility (e.g., through respective devices) to observe the aggregated data across the group of devices, a subset of the group of device, and an individual device of the group of devices. The criteria can include, but is not limited to, a type of network traffic, patterns associated with network traffic usage, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 6:
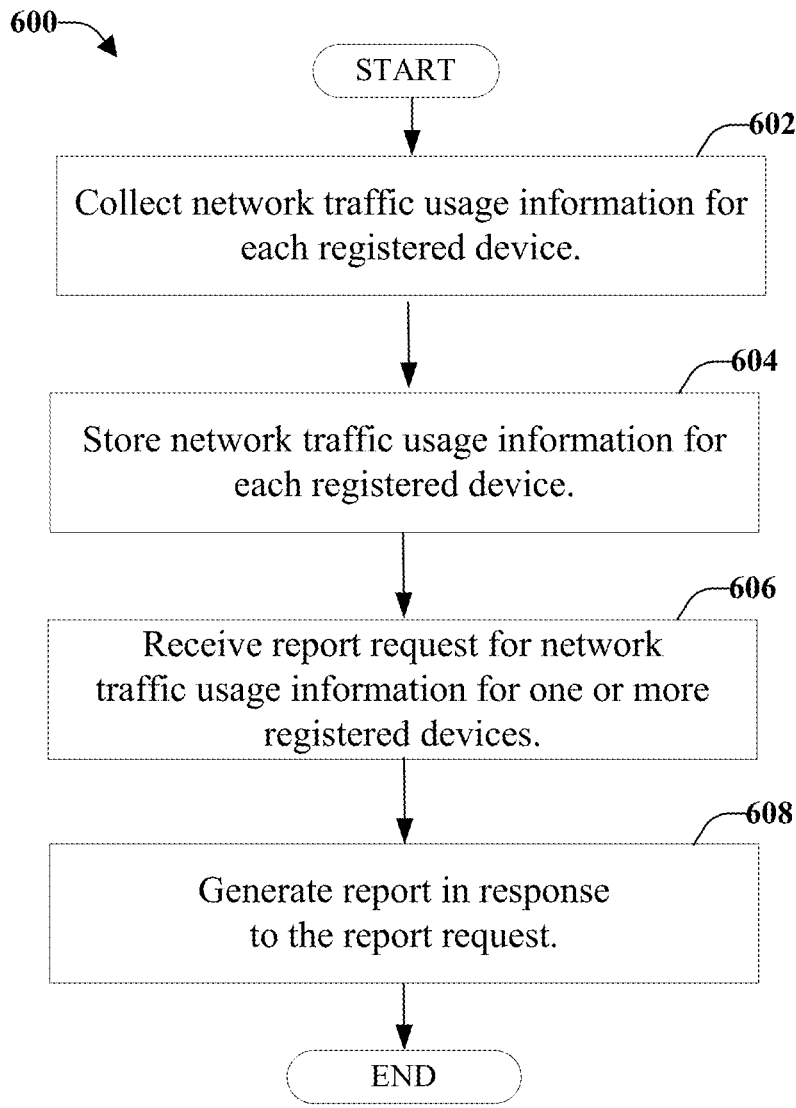
FIG. 6 illustrates an example, non-limiting method for managing a group of registered devices, according to an aspect.

FIG. 6 illustrates an example, non-limiting method 600 for managing a group of registered devices, according to an aspect. The disclosed aspects can provide a comprehensive manner of managing a group of registered devices. Further, the group of registered devices is scalable such that devices can be added to the group and/or removed from the group, as needed. At about the same time as a device is added to the group, monitoring of network traffic activity on that device commences. Further, monitoring of a device can be stopped at about the same time as the device is removed from the group. Method 600 can be performed within a cellular service provider portion of a communications network. For example, method 600 can be performed by network devices of a communications network, the network devices can be associated with a cellular service provider identity.

Method 600 starts, at 602, when network traffic usage information for a group of registered devices is collected. The network traffic usage information can be received from one or more network devices operating within a mobile communications environment. The network traffic usage information can include voice traffic information, data traffic information, short message service information, or combinations thereof. For example, for each registered device, one or more different types of network traffic usage information might be collected. For example, a user might use the device to send and/or receive voice calls and, further, might use the device to browse the Internet (or use other functionalities of the device). The different types of information associated with each type of usage can be monitored by the one or more network devices and communicated to another component for further processing as discussed herein.

At 604, the network traffic usage information is stored for each device of the group of registered devices. For example, a data structure can include identifying information for each device and the network traffic usage information can be associated with a particular device based on the identifying information. Thus, the data structure can correspond each type of network traffic usage and associated network traffic usage information to the specific device. According to some implementations, the network traffic usage information can be aggregated for two or more registered devices and stored for later retrieval and reporting purposes.

A request for a report of the network traffic usage information is received, at 606. The request can be for information associated with network traffic usage for all devices of the group of registered devices, a subset of two or more devices of the group of registered devices, or an individual device of the group of registered devices. In accordance with an implementation, the request can be for a summary of one or more network traffic statistics associated with one or more devices of the group of registered devices.

At 608, the report is generated in response to the request and can be sent to an administrator device and/or to one or more registered devices. The report can include at least a subset of the traffic usage information. The usage reports allow organizations to take management control of the registered devices to avoid unnecessary unproductive network traffic usage. Further, the usage reports can allow the organizations to identify activities that violate network security policies. In addition, the reports can be used for resource management and optimization. For example, the reports can be used to identify high usage users and/or data activities that could potentially cause service degradation for critical business applications. Additionally or alternatively, the reports can serve as feedback for organizational network regulations and policies improvement as well as enforcement methods and procedures.

Figure 7:
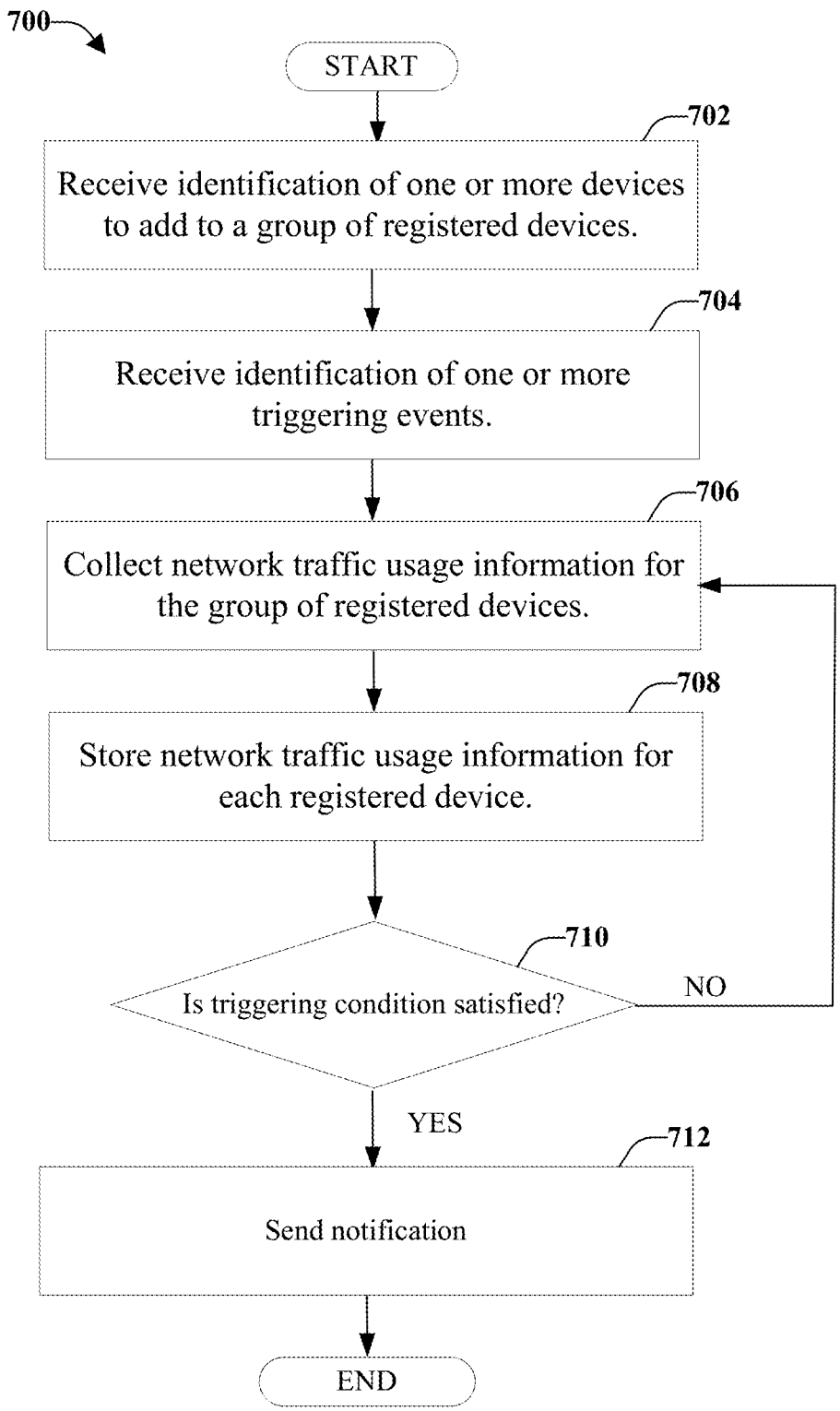
FIG. 7 illustrates an example, non-limiting method for identifying trigger events that relate to one or more registered devices, according to an aspect.

FIG. 7 illustrates an example, non-limiting method 700 for identifying triggering events that relate to one or more registered devices, according to an aspect. An organization can indicate one or more triggering events for which a notification is requested. For example, the triggering events can be a threshold level indicating a maximum amount of network traffic usage. If the network traffic usage reaches or exceeds the maximum amount, the condition is satisfied and a notification can be sent. In another example, the triggering event can be an activity, such as attempting to access a restricted website.

Method 700 starts, at 702, when an identification of one or more devices for monitoring is received and the one or more devices are included in a group of registered devices. The identification of the one or more mobile devices can include receiving an international mobile subscriber identifier (IMSI) of the mobile device, an international mobile equipment identifier (IMEI), a telephone number, or other identifying information. For example, an organization can provide devices and/or a person associated with the organization can have a personal device and use the personal device for purposes related to the organization. In both situations (e.g., provided devices and personal devices) it might be beneficial to the organization to monitor and analyze network traffic usage of the devices to determine if the usage conforms to organizational policies and procedures. If there is a potential breach or nonconformance with the policies and procedures, the organization is made aware of the situation and further action can be taken as necessary.

At 704, information related to one or more triggering events is received. The one or more triggering events can be parameters associated with the network traffic usage information. For example, an organization can specify one or more events and/or threshold levels that should be monitored.

Network traffic usage information is received, at 706. The network traffic usage information can be received from one or more network devices that collect the information inside the mobile network. As such, collection of the network traffic usage is device agnostic such that there is no computational power or operating system requirements on each device. In an example, the network devices can be devices already existing within the mobile network and that perform various functions. For example, the network devices can be gateway GPRS support nodes and/or devices at a mobile switching center.

The received network traffic usage information can be stored, at 708, in one or more storage devices (e.g., data stores) in any variety of retrievable formats. For example, the network traffic usage information can be maintained in a database or as a data structure that correlates each device with its respective network traffic usage information.

At 710, a determination is made whether the triggering condition has been satisfied. For example, if the triggering condition is a maximum number of bytes, a determination can be made (e.g., using trigger component 404) whether the number of bytes used meets or exceeds the maximum number of bytes. If the determination is that the triggering condition has not been satisfied ("NO"), method 700 continues at 706 with the continuing collection of network traffic usage information. If the determination is that the condition has been satisfied ("YES"), method 700 continues at 712.

At 712, a notification is dynamically sent to the organization, according to an aspect. For example, the notification can be sent through a push notification to the organization. In another example, the notification can be sent through a SMS message. In yet another example, the notification can be sent through an email notification. In another example, the notification can be sent through a voice call.

According to an implementation, the notification is sent to the mobile device that triggered the event (e.g., sent to the end user). For example, the traffic usage information gathered from the registered device (e.g., registered end user device) can be provided to each end user (e.g., person using the registered device). Providing this information can allow the end user to monitor their usage patterns and help that person to remain in compliance with organizational policies. Thus, the end user can be more aware of how they are actually using the device and, if needed, modify their behavior.

Figure 8:
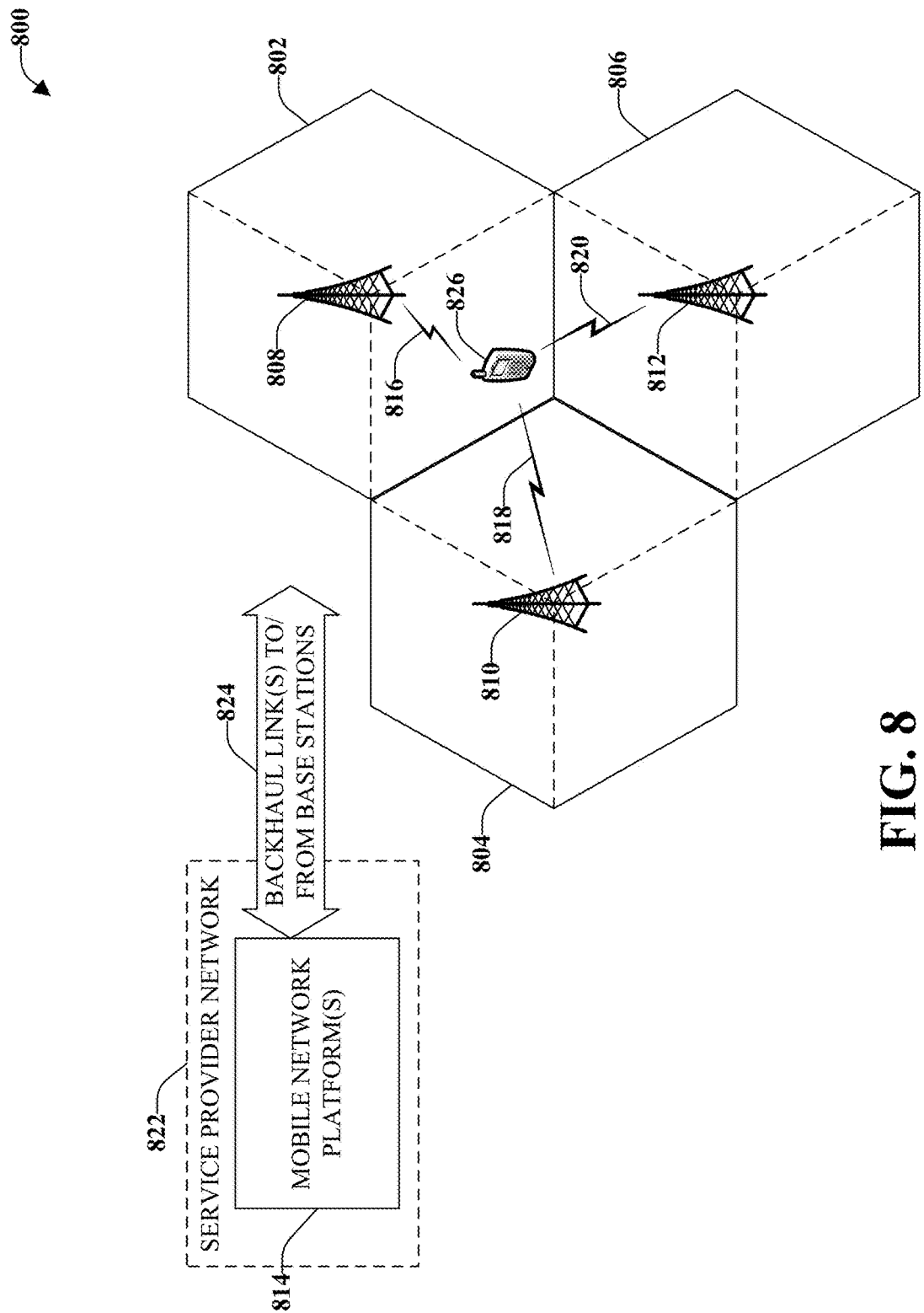
FIG. 8 is a schematic example wireless environment that can operate in accordance with aspects described herein.

By way of further description with respect to one or more non-limiting ways to facilitate data usage monitoring, analysis, and reporting, FIG. 8 is a schematic example wireless environment 800 that can operate in accordance with aspects described herein. In particular, example wireless environment 800 illustrates a set of wireless network macro cells. Three coverage macro cells 802, 804, and 806 include the illustrative wireless environment; however, it is noted that wireless cellular network deployments can encompass any number of macro cells. Coverage macro cells 802, 804, and 806 are illustrated as hexagons; however, coverage cells can adopt other geometries generally dictated by a deployment configuration or floor plan, geographic areas to be covered, and so on. Each macro cell 802, 804, and 806 is sectorized in a $2\pi/3$ configuration in which each macro cell includes three sectors, demarcated with dashed lines in FIG. 8. It is noted that other sectorizations are possible, and aspects or features of the disclosed subject matter can be exploited regardless of type of sectorization. Macro cells 802, 804, and 806 are served respectively through base stations or eNodeBs 808, 810, and 812. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 814, and set of base stations (e.g., eNode B 808, 810, and 812) that serve a set of macro cells; electronic circuitry or components associated with the base stations in the set of base stations; a set of respective wireless links (e.g., links 816, 818, and 820) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 816, 818, and 820 embody a Uu interface (universal mobile telecommunication system Air Interface).

Mobile network platform(s) 814 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 822 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 814 can control and manage base stations 808, 810, and 812 and radio component(s) associated thereof, in disparate macro cells 802, 804, and 806 by way of, for example, a wireless network management component (e.g., radio network controller(s), cellular gateway node(s), etc.). Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, mobile network platform 814 can be embodied in the service provider network 822.

In addition, wireless backhaul link(s) 824 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 824 embodies IuB interface.

It is noted that while exemplary wireless environment 800 is illustrated for macro cells and macro base stations, aspects, features and advantages of the disclosed subject matter can be implemented in micro cells, pico cells, femto cells, or the like, wherein base stations are embodied in home-based equipment related to access to a network.

Figure 9:
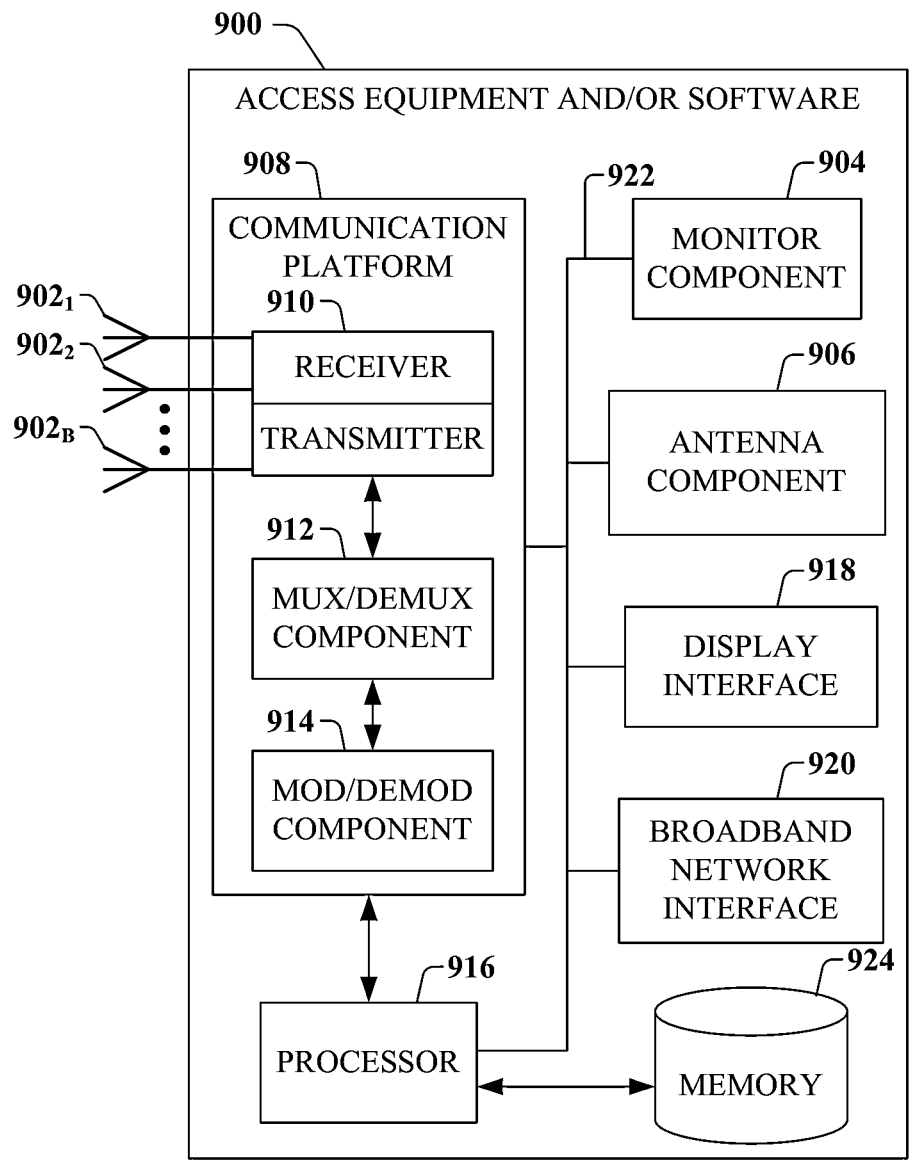
FIG. 9 illustrates a block diagram of access equipment and/or software related to access of a network, in accordance with an embodiment.

To provide further context for various aspects of the disclosed subject matter, FIG. 9 illustrates a block diagram of an embodiment of access equipment and/or software 900 related to access of a network (e.g., base station, wireless access point, femtocell access point, and so forth) that can enable and/or exploit features or aspects of the disclosed aspects.

Access equipment and/or software 900 related to access of a network can receive and transmit signal(s) from and to wireless devices, wireless ports, wireless routers, etc. through segments $902_1$-$902_B$ (B is a positive integer). Segments $902_1$-$902_B$ can be internal and/or external to access equipment and/or software 900 related to access of a network, and can be controlled by a monitor component 904 and an antenna component 906. Monitor component 904 and antenna component 906 can couple to communication platform 908, which can include electronic components and associated circuitry that provide for processing and manipulation of received signal(s) and other signal(s) to be transmitted.

In an aspect, communication platform 908 includes a receiver/transmitter 910 that can convert analog signals to digital signals upon reception of the analog signals, and can convert digital signals to analog signals upon transmission. In addition, receiver/transmitter 910 can divide a single data stream into multiple, parallel data streams, or perform the reciprocal operation. Coupled to receiver/transmitter 910 can be a multiplexer/demultiplexer 912 that can facilitate manipulation of signals in time and frequency space. Multiplexer/demultiplexer 912 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 912 can scramble and spread information (e.g., codes, according to substantially any code known in the art, such as Hadamard-Walsh codes, Baker codes, Kasami codes, polyphase codes, and so forth).

A modulator/demodulator 914 is also a part of communication platform 908, and can modulate information according to multiple modulation techniques, such as frequency modulation, amplitude modulation (e.g., M-ary quadrature amplitude modulation, with M a positive integer); phase-shift keying; and so forth).

Access equipment and/or software 900 related to access of a network also includes a processor 916 configured to confer, at least in part, functionality to substantially any electronic component in access equipment and/or software 900. In particular, processor 916 can facilitate configuration of access equipment and/or software 900 through, for example, monitor component 904, antenna component 906, and one or more components therein. Additionally, access equipment and/or software 900 can include display interface 918, which can display functions that control functionality of access equipment and/or software 900, or reveal operation conditions thereof. In addition, display interface 918 can include a screen to convey information to an end user. In an aspect, display interface 918 can be a liquid crystal display), a plasma panel, a monolithic thin-film based electrochromic display, and so on. Moreover, display interface 918 can include a component (e.g., speaker) that facilitates communication of aural indicia, which can also be employed in connection with messages that convey operational instructions to an end user. Display interface 918 can also facilitate data entry (e.g., through a linked keypad or through touch gestures), which can cause access equipment and/or software 900 to receive external commands (e.g., restart operation).

Broadband network interface 920 facilitates connection of access equipment and/or software 900 to a service provider network (not shown) that can include one or more cellular technologies (e.g., third generation partnership project universal mobile telecommunication system, global system for mobile communication, and so on.) through backhaul link(s) (not shown), which enable incoming and outgoing data flow. Broadband network interface 920 can be internal or external to access equipment and/or software 900, and can utilize display interface 918 for end-user interaction and status information delivery.

Processor 916 can be functionally connected to communication platform 908 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 916 can be functionally connected, through data, system, or an address bus 922, to display interface 918 and broadband network interface 920, to confer, at least in part, functionality to each of such components.

In access equipment and/or software 900, memory 924 can retain location and/or coverage area (e.g., macro sector, identifier(s)), access list(s) that authorize access to wireless coverage through access equipment and/or software 900, sector intelligence that can include ranking of coverage areas in the wireless environment of access equipment and/or software 900, radio link quality and strength associated therewith, or the like. Memory 924 also can store data structures, code instructions and program modules, system or device information, code sequences for scrambling, spreading and pilot transmission, access point configuration, and so on. Processor 916 can be coupled (e.g., through a memory bus), to memory 924 in order to store and retrieve information used to operate and/or confer functionality to the components, platform, and interface that reside within access equipment and/or software 900.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 924, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 10:
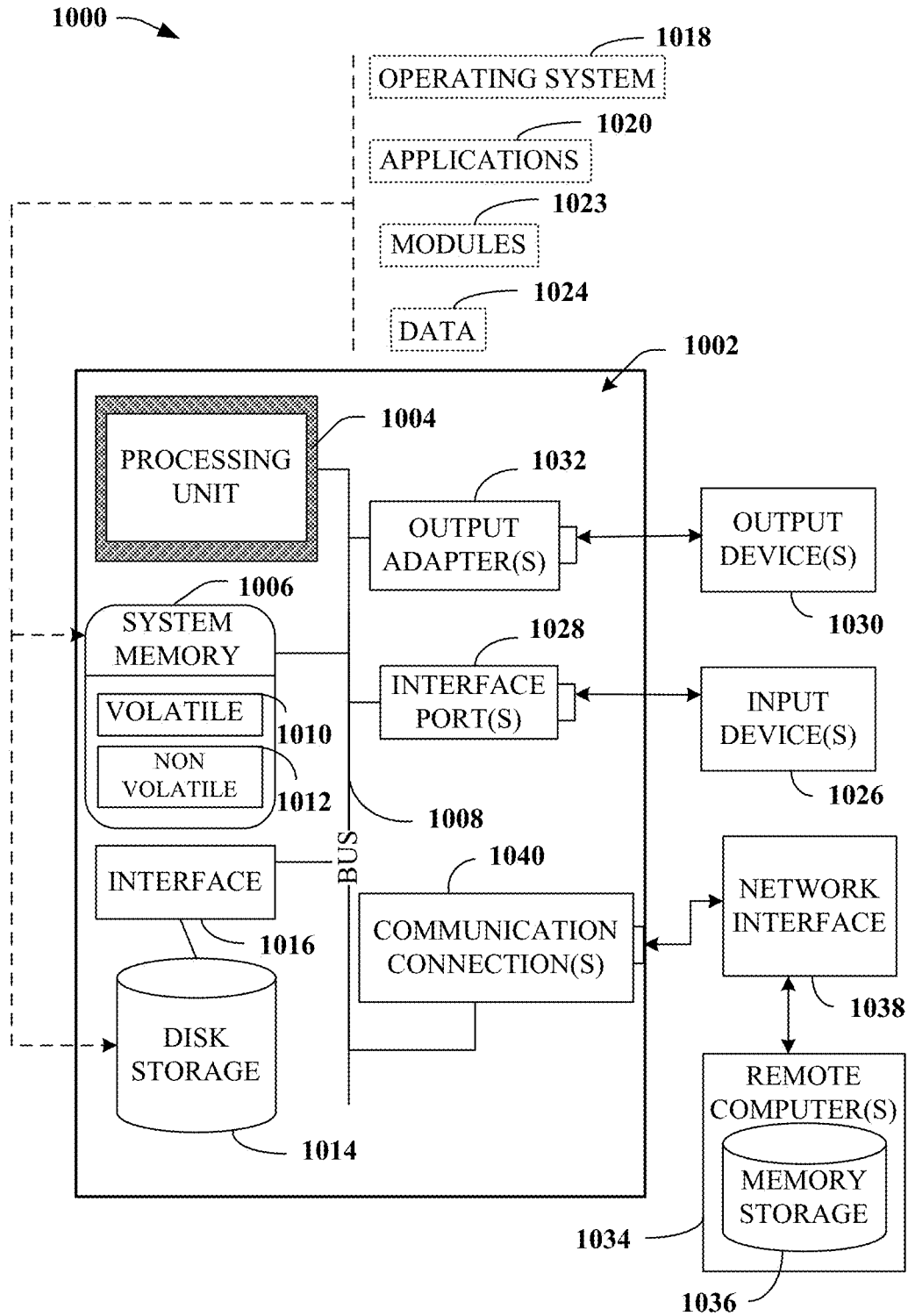
FIG. 10 illustrates a block diagram of a computing system, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as at least one memory 102) there can be software, which can instruct a processor (such as at least one processor 104) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1002 includes a processing unit 1004, a system memory 1006, and a system bus 1008. System bus 1008 couples system components including, but not limited to, system memory 1006 to processing unit 1004. Processing unit 1004 can be any of various available processors. Dual microprocessors and other multiprocessor architectures also can be employed as processing unit 1004.

System bus 1008 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (institute of electrical and electronics engineers 1194), and small computer systems interface.

System memory 1006 includes volatile memory 1010 and nonvolatile memory 1012. A basic input/output system, containing routines to transfer information between elements within computer 1002, such as during start-up, can be stored in nonvolatile memory 1012. By way of illustration, and not limitation, nonvolatile memory 1012 can include read only memory, programmable read only memory, electrically programmable read only memory, electrically erasable programmable read only memory, or flash memory. Volatile memory 1010 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1002 also includes removable/non-removable, volatile/non-volatile computer storage media. In an implementation, provided is a non-transitory or tangible computer-readable medium storing computer-executable instructions that, in response to execution, cause a system comprising a processor to perform operations. The operations can include obtaining network traffic usage information associated with a plurality of registered mobile devices. The operations can also include receiving a request for a report of the network traffic usage information, wherein the request is received from an administrator device associated with the plurality of registered mobile devices. Further, the operations can include sending a customizable report to the administrator device. The customizable report can comprises at least a subset of the network traffic usage information. Further, the obtaining, the receiving, and the sending can be performed by network devices within a communications that are associated with a mobile service provider identity.

According to an implementation, the operations can include receiving a threshold condition associated with the network traffic usage information and monitoring the network traffic usage information for the threshold condition. Further, the operations can include pushing an alert of the threshold condition being satisfied to the administrator device.

According to another implementation, the operations can include receiving a report frequency parameter that represents a frequency for the reports and a granularity level for the report, which represents a defined level of detail for the reports. Also, the operations can include generating the report comprising traffic network usage information at the granularity level, and wherein the sending the customizable report comprises sending the report at a frequency indicated by the report frequency parameter.

FIG. 10 illustrates, for example, disk storage 1014. Disk storage 1014 includes, but is not limited to, devices such as a magnetic disk drive, floppy disk drive, tape drive, Jaz drive, Zip drive, superdisk drive, flash memory card, or memory stick. In addition, disk storage 1014 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1014 to system bus 1008, a removable or non-removable interface is typically used, such as interface component 1016.

It is to be noted that FIG. 10 describes software that acts as an intermediary between users and computer resources described in suitable operating environment. Such software includes an operating system 1018. Operating system 1018, which can be stored on disk storage 1014, acts to control and allocate resources of computer system 1002. System applications 1020 can take advantage of the management of resources by operating system 1018 through program modules 1022 and program data 1024 stored either in system memory 1006 or on disk storage 1014. It is to be understood that the disclosed subject matter can be implemented with various operating systems or combinations of operating systems.

A user can enter commands or information, for example through interface component 1016, into computer system 1002 through input device(s) 1026. Input devices 1026 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1004 through system bus 1008 through interface port(s) 1028. Interface port(s) 1028 include, for example, a serial port, a parallel port, a game port, and a universal serial bus. Output device(s) 1030 use some of the same type of ports as input device(s) 1026.

Thus, for example, a universal serial bus port can be used to provide input to computer 1002 and to output information from computer 1002 to an output device 1030. Output adapter 1032 is provided to illustrate that there are some output devices 1030, such as monitors, speakers, and printers, among other output devices 1030, which use special adapters. Output adapters 1032 include, by way of illustration and not limitation, video and sound cards that provide means of connection between output device 1030 and system bus 1008. It is also noted that other devices and/or systems of devices provide both input and output capabilities such as remote computer(s) 1034.

Computer 1002 can operate in a networked environment using logical connections to one or more remote computers, such as remote computer(s) 1034. Remote computer(s) 1034 can be a personal computer, a server, a router, a network computer, a workstation, a microprocessor based appliance, a peer device, or other common network node and the like, and typically includes many or all of the elements described relative to computer 1002.

For purposes of brevity, only one memory storage device 1036 is illustrated with remote computer(s) 1034. Remote computer(s) 1034 is logically connected to computer 1002 through a network interface 1038 and then physically connected through communication connection 1040. Network interface 1038 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks like integrated services digital networks and variations thereof, packet switching networks, and digital subscriber lines.

Communication connection(s) 1040 refer(s) to hardware/software employed to connect network interface 1038 to system bus 1008. While communication connection 1040 is shown for illustrative clarity inside computer 1002, it can also be external to computer 1002. The hardware/software for connection to network interface 1038 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, long term evolution advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
    a processor; and
    a memory that stores executable instructions that, when executed by the processor, facilitate performance of operations, comprising:
        storing network traffic usage information associated with registered mobile devices registered to use network devices of a communication network, wherein the network traffic usage information comprises a mapping between a device associated with the registered mobile devices and a group of types of traffic usage associated with use of the device, wherein the mapping is determined as a function of a statistical analysis that classifies the device with a classification of the device as having communicated via one type of traffic usage included in the group of types of traffic usage, wherein the classification of the device is determined using a classifier that maps an attribute vector representing an input attribute to a confidence score that the input attribute belongs to a class, wherein the classifier determines a repeatedly changing hypersurface using the attribute vector, wherein the input attribute represents at least short message service data representative of short message service traffic, and wherein the class represents a group of data comprising an amount of network traffic usage for the type of traffic usage, the type of network traffic usage, and a duration of the type of network traffic usage;
        receiving a request for the network traffic usage information, wherein the request is received from the device associated with the registered mobile devices;
        sending a report to the device, wherein the report comprises at least a portion of the network traffic usage information, wherein the storing, the receiving, and the sending are performed by a network device of the network devices of the communications network; and
        sending an alert to the device in response to an increase in volume of data traffic to the registered mobile devices, wherein the increase is determined as a first function of the network traffic usage information and as a second function of a threshold condition being exceeded by the device, wherein the threshold condition represents a breach of a security policy, a breach of an access policy, an increase in data usage, an increase in voice usage, and a restricted website being accessed.

2. The system of claim 1, wherein the operations further comprise:
    receiving the threshold condition associated with a traffic statistic of the network traffic usage information;
    monitoring the network traffic usage information for the traffic statistic; and
    transmitting to the device an indication of the traffic statistic satisfying the threshold condition.

3. The system of claim 1, wherein the operations further comprise:
    receiving an indication of a mobile device to be registered as one of the registered mobile devices, wherein the mobile device is associated with an organization comprising the device; and
    monitoring device network traffic usage information of the mobile device for inclusion in the network traffic usage information before the storing.

4. The system of claim 1, wherein the operations further comprise:
    receiving a parameter of the network traffic usage information to include in the report; and
    modifying the report to include the parameter.

5. The system of claim 1, wherein the network traffic usage information is first network traffic usage information, wherein the mobile device is a first mobile device, and wherein the operations further comprise, at about a same time:
    receiving an identification of a second mobile device to include in the registered mobile devices; and
    receiving second network traffic usage information for the second mobile device.

6. The system of claim 1, wherein the network traffic usage information comprises traffic statistics collected on a voice channel and on a data channel of a registered mobile device of the registered mobile devices.

7. The system of claim 1, wherein at least the portion of the network traffic usage information comprises a traffic statistic, and the operations further comprise, before the generating the report:
    receiving a report frequency parameter representing a frequency for reports; and
    receiving a granularity level for the report representing a defined level of detail for reports.

8. The system of claim 1, wherein the operations further comprise:
    initiating transmissions of respective network traffic usage information, for respective mobile devices of the registered mobile devices, to the respective mobile devices.

9. The system of claim 1, wherein the network traffic usage information comprises data traffic.

10. The system of claim 1, wherein the network traffic usage information comprises voice traffic.

11. The system of claim 1, wherein the network traffic usage information comprises text message service traffic.

12. A method, comprising:
    receiving, by a system comprising a processor, an identifier of a device affiliated with a subscribing organization identity, wherein the identifier is associated with a mapping representative of an association between the device and a group of types of network traffic usage associated with use of the device, wherein the mapping of the association between the device and the group of types of network traffic usage is determined based on a probabilistic analysis that classifies the device as having used one of the types of network traffic usage included in the group of types of network traffic usage, wherein classification of the device is determined based on a classifier that maps an attribute vector representing an input attribute to a confidence score that the input attribute belongs to a class and that determines a multiply changing hypersurface using the attribute vector, wherein the input attribute represents at least short message service traffic, and wherein the class represents a group of data comprising an amount of network traffic usage for the one of the types of network traffic usage, the one of the types of network traffic usage, and a duration of the one of the types of network traffic usage;

monitoring, by the system, the network traffic usage of the device comprising monitoring voice traffic, data traffic, and text message service traffic;

creating, by the system, a customizable report that comprises a subset of the network traffic usage of the device;

sending, by the system, the customizable report to a device associated with the subscribing organization identity;

sending, by the system, a first alert to the device associated with the subscribing organization identity in response to determining that the device affiliated with the subscribing organization identity has exceeded a threshold condition representative of a breach of security policy, a breach in access policy, an increase in data usage, an increase in voice usage, and an access to a restricted website.

13. The method of claim 12, further comprising:
receiving, by the system, a request to include a parameter of the network traffic usage in the customizable report; and
including, by the system, the parameter in the customizable report; and
resending, by the system, the customizable report to the device associated with the subscribing organization identity.

14. The method of claim 12, further comprising:
receiving, by the system, a parameter associated with the network traffic usage;
monitoring, by the system, the network traffic usage information for the parameter; and
transmitting, by the system, a notification based on the network traffic usage satisfying the parameter.

15. The method of claim 14, wherein the transmitting comprises sending a second alert to the device associated with the subscribing organization identity.

16. The method of claim 12, wherein the sending comprises sending the customizable report in a format accessible by the device associated with the subscribing organization identity via a mobile application.

17. The method of claim 12, wherein the sending comprises sending the customizable report in a format accessible by the device associated with the subscribing organization identity via a network browser application.

18. A non-transitory computer-readable medium, comprising executable instructions that, when executed by a processor, facilitate performance of operations, comprising:
obtaining network traffic usage information associated with registered mobile devices, wherein the network traffic usage information is stored as a mapping between a device associated with the registered mobile devices and a group of types of traffic usage associated with use of the device, wherein the mapping is determined as a function of a probabilistic analysis that classifies the device as having communicated via one type of traffic usage included in the group of types of traffic usage, wherein classification of the device is determined based on using a classifier that maps an attribute vector representing an input attribute to a confidence score that the input attribute belongs to a class and that determines a dynamically changing hypersurface using the attribute vector, wherein the input attribute represents at least short message service traffic, and wherein the class represents a group of data comprising an amount for the type of network traffic usage, the type of network traffic usage, and a duration of the type of network traffic usage;

receiving a request for a report of the network traffic usage information, wherein the request is received from an administrator device associated with the registered mobile devices;

sending a customizable report to the administrator device, wherein the customizable report comprises at least some of the network traffic usage information, and wherein the obtaining, the receiving, and the sending are performed by network devices within a communications network;

as a function of the network traffic usage information, identifying an increase in data traffic volume being transmitted to the registered mobile devices, wherein the increase in data traffic volume is determined as a function of a threshold condition being exceeded by the registered mobile devices, wherein the threshold condition represents a breach of a security policy and access policy, an increase in data usage and in voice usage, and an access to a restricted website; and in response to the identifying, sending a first alert to the registered mobile devices indicating the increase in data traffic volume.

19. The non-transitory computer-readable medium of claim 18, the operations further comprising:
receiving the threshold condition associated with the network traffic usage information;
monitoring the network traffic usage information for an occurrence of the threshold condition; and
in response to the occurrence of the threshold condition, pushing a second alert of the occurrence of the threshold condition to the administrator device.

20. The non-transitory computer-readable medium of claim 18, the operations further comprising:
receiving a report frequency parameter and a granularity level for the report; and
generating the report comprising the network traffic usage information at the granularity level, wherein the sending the customizable report comprises sending the report at a frequency indicated by the report frequency parameter.

* * * * *